(12) United States Patent
Ogushi (10) Patent No.: US 6,505,235 B1
(45) Date of Patent: *Jan. 7, 2003

(54) ELECTRONIC MAIL SYSTEM AND TERMINAL DEVICE

(75) Inventor: Nobuo Ogushi, Tokushima (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,406

(22) Filed: Jun. 30, 1998

(30) Foreign Application Priority Data

Aug. 8, 1997 (JP) .............................. 9-215347

(51) Int. Cl.[7] .............................................. G06F 13/00
(52) U.S. Cl. ...................................................... 709/206
(58) Field of Search ................................ 709/206, 207, 709/245, 204, 223, 224; 395/200.54, 200.68; 364/479.03

(56) References Cited

U.S. PATENT DOCUMENTS

| | | | | |
|---|---|---|---|---|
| 5,276,869 A | * | 1/1994 | Forrest et al. ............... | 709/206 |
| 5,426,594 A | * | 6/1995 | Wright et al. ............... | 709/206 |
| 5,764,898 A | * | 6/1998 | Tsuji et al. .................. | 709/206 |
| 5,790,790 A | * | 8/1998 | Smith et al. ................. | 709/206 |
| 5,796,948 A | * | 8/1998 | Cohen ......................... | 709/206 |
| 5,826,022 A | * | 10/1998 | Nielsen ....................... | 709/206 |
| 5,832,220 A | * | 11/1998 | Johnson et al. ............. | 709/206 |
| 5,944,786 A | * | 8/1999 | Quinn ......................... | 709/206 |
| 5,951,638 A | * | 9/1999 | Hoss et al. .................. | 709/206 |
| 5,987,503 A | * | 11/1999 | Murakami ................... | 709/204 |
| 5,993,048 A | * | 11/1999 | Banks et al. ........... | 364/479.03 |
| 6,014,711 A | * | 1/2000 | Brown ........................ | 709/245 |
| 6,124,939 A | * | 9/2000 | Toyoda et al. ............. | 358/1.15 |
| 6,178,442 B1 | * | 1/2001 | Yamazaki ................... | 709/206 |
| 6,199,103 B1 | * | 3/2001 | Sakagughi et al. ......... | 709/206 |
| 6,272,530 B1 | * | 8/2001 | Horiuchi et al. ............ | 709/206 |

FOREIGN PATENT DOCUMENTS

| | | | |
|---|---|---|---|
| JP | 5-344148 | 12/1993 | |
| JP | 6-195275 | 7/1994 | ........... G06F/13/00 |

OTHER PUBLICATIONS

Japanese Office Action, Patent Application No. 9–215347, 1994, with English language translation.

* cited by examiner

*Primary Examiner*—David Wiley
(74) *Attorney, Agent, or Firm*—Staas & Halsey LLP (57) ABSTRACT

An electronic mail system adapted to provide a client terminal device side with a nonread-read executive function for checking whether or not a receiving side has read an electronic mail. The out-going side client terminal device adds request information for read information notice to the electronic mail and transmits the electronic mail to the in-coming side client terminal device. After the in-coming side client terminal device reads the electronic mail, it then sends the read information to the out-going side client terminal device.

23 Claims, 6 Drawing Sheets

ELECTRONIC MAIL SYSTEM AND TERMINAL DEVICE

BACKGROUND OF THE INVENTION

1. Field of the Invention

The present invention relates to an electronic mail system and more specifically to an electronic mail system which enables a client side to check whether or not a mail has been read.

2. Description of the Prior Art

With the spread of a personal computer, the field of information communication is more increasingly occupied by an electronic mail system in which character, audio, picture or other information is transmitted/received in the form of a mail between client terminal devices through a computer network. In the electronic mail system constructed through a wide area network, that is, in a distributed electronic mail system, the computer for providing a service to the client-side computer, a so-called server is generally installed on the network. The transmission/receipt of information between the client terminal devices is accomplished through the server.

Unlike a telephone communication, such an electronic mail system does not allow the clients to communicate the information directly to each other. Thus, a particular executive system is needed in order to check whether or not a transmitted electronic mail has been really read by a receiving side (transmit opponent), that is, to check whether the electronic mail has been unread or read. Heretofore, such an electronic mail nonread-read execution has been generally performed by the server in the electronic mail system.

Depending on the function of the electronic mail system which the client terminal device using the electronic mail belongs to, the service available to the client terminal device is limited. Therefore, in order that the executive function is used by the client terminal device requiring the above-described electronic mail nonread-read execution, there is a need for adding this type of function to the server in the electronic mail system which the client terminal device belongs to. Consequently, it is impossible to add the nonread-read executive function by the intention of the client.

In addition, the electronic mail nonread-read execution has been heretofore performed on the server side in this manner, and thus all the receiving sides (transmit opponents) are to be executed for checking whether or not the mail has been read. As a result, the receiving side to be executed cannot be specified on a client-by-client basis. More disadvantageously, the conventional executive system cannot comply with an alias expansion function for collectively executing a plurality of receiving sides (transmit opponents) as a single receiving side (transmit opponent).

BRIEF SUMMARY OF THE INVENTION

It is an object of the present invention to provide an electronic mail system capable of introducing an electronic mail nonread-read executive function by the intention of a client without considerably changing an existing electronic mail system, and a terminal device for use in the system.

It is another object of the present invention to provide an electronic mail system capable of optionally selecting a receiving side to be executed for checking whether or not an electronic mail has been read, and a terminal device for use in the system.

It is a still another object of the present invention to provide an electronic mail system capable of performing an electronic mail nonread-read execution in response to an alias expansion function, and a terminal device for use in the system.

In the electronic mail system of the present invention for transmitting/receiving the electronic mail between the terminal devices connected to each other via a server on a network, the terminal device comprises executive means for performing the electronic mail nonread-read execution for checking whether or not the receiving side has read the electronic mail. This executive means performs the electronic mail nonread-read execution in response to header information of the transmitted/received electronic mail.

This executive means has library means in which the receiving side to be executed for checking whether or not the electronic mail has been read is recorded, whereby the electronic mail having the recorded receiving side is executed for checking whether or not it has been read by the receiving side.

This executive means comprises storage means for storing electronic mail nonread-read information; library means having a library table in which the receiving side to be executed for checking whether or not the electronic mail has been read is recorded; executive control means for determining whether or not the electronic mail to be transmitted is to be executed for checking whether or not it is read and for writing the contents stored in the storage means; request addition means for adding request information for read notice to the electronic mail to be executed for checking whether or not it is read; request judgement means for judging whether or not the request information is added to the received electronic mail; and read information send means for sending read information when the electronic mail with the request information added is received.

This executive means further comprises means for performing an alias expansion, whereby a single electronic mail is executed for checking whether or not it has been read by a plurality of receiving sides in accordance with the result of the alias expansion.

According to the present invention, the client terminal device side is provided with the nonread-read executive function for checking whether or not the receiving side has read the electronic mail. The out-going side client terminal device adds the request information for read information notice to the electronic mail and transmits the electronic mail to the in-coming side client terminal device. After the in-coming side (receiving side) client terminal device reads the electronic mail, it then sends the read information to the out-going side client terminal device.

Therefore, the nonread-read execution can be achieved by adding the function to the client terminal device side alone without considerably changing the existing electronic mail system. In addition, the client terminal device side can optionally set the receiving side to be executed for checking whether or not the electronic mail is read, and thus the present invention has higher convenience.

The above and further objects and features of the invention will more fully be apparent from the following detailed description with accompanying drawings.

DETAILED DESCRIPTION OF THE INVENTION

Figure 1:
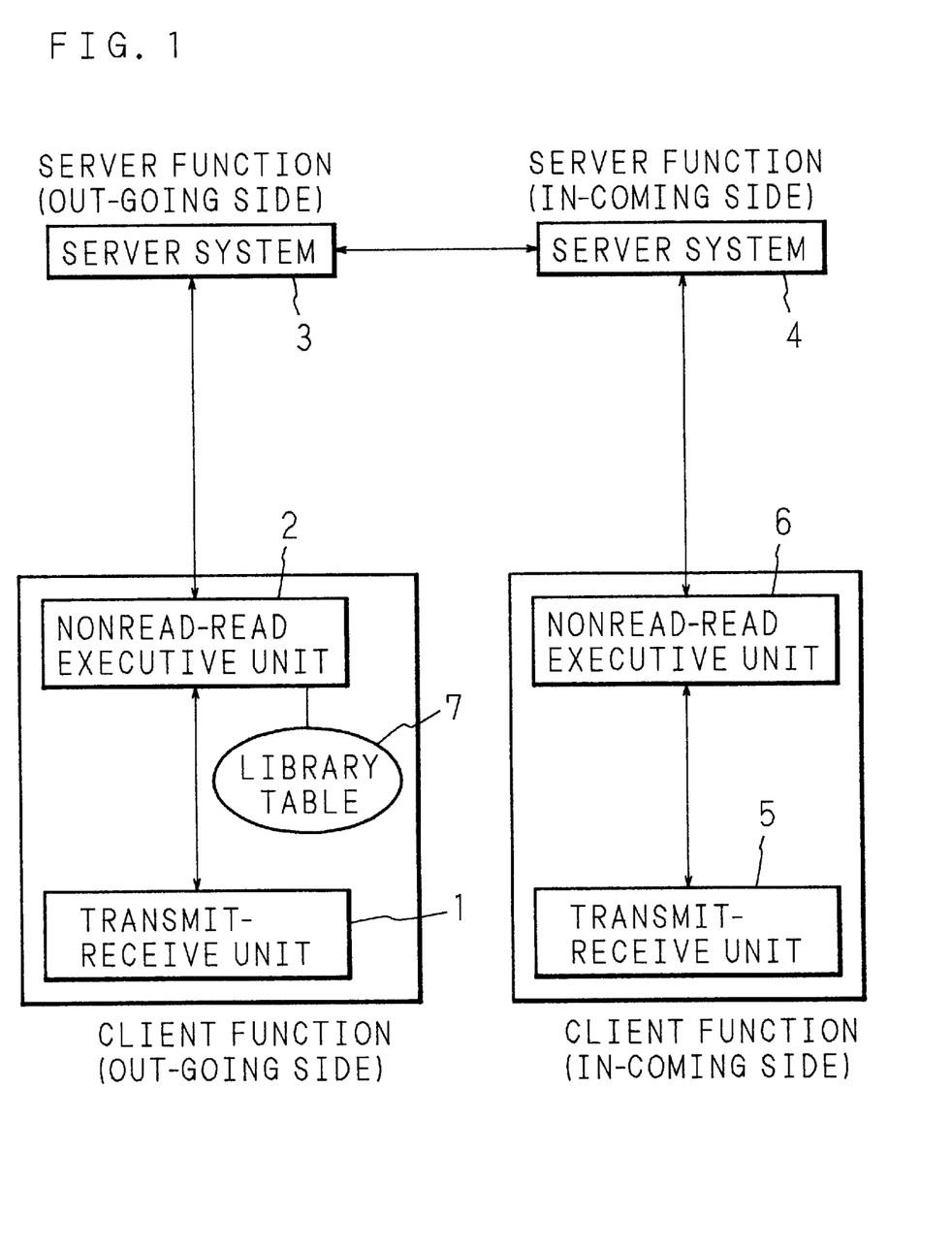
FIG. 1 is an illustrative diagram for describing a principle of the present invention.

FIG. 1 is an illustrative diagram for describing a principle of the present invention. Means for performing an out-going side client function comprises a transmit-receive unit 1 for transmitting/receiving an electronic mail and a nonread-read executive unit 2 for performing a nonread-read execution for the electronic mail on the out-going side. The nonread-read executive unit 2 has a library table 7 in which a receiving side to be executed for checking whether the electronic mail has been read is recorded. Also, means for performing an in-coming side client function comprises a transmit-receive unit 5 for transmitting/receiving the electronic mail and a nonread-read executive unit 6 for performing the nonread-read execution for the electronic mail on the in-coming side. Moreover, means for carrying out a server function on the out-going and in-coming sides comprise server systems 3 and 4, respectively.

Next, the processing of the electronic mail nonread-read execution in such a constitution will be described below. In the first place, when the electronic mail is transmitted from the transmit-receive unit 1 of an out-going side client terminal device to the server system 3 through the nonread-read executive unit 2, whether or not the receiving side (transmit opponent) is recorded in the library table 7 is checked. If the receiving side is recorded in the library table 7, the electronic mail is the one requiring the check so as to see whether or not it is read. Thus, after information on the receiving side associated with the electronic mail is internally stored as nonread executive information, request information for read information notice is added to the electronic mail, and then the electronic mail is transmitted to the server system 3.

The electronic mail is transmitted from the server system to the server system 4, and then it is input to the in-coming side client terminal device by the operation of the transmit-receive unit 5. The nonread-read executive unit 6 determines whether or not the request information for read information notice is added to the transmitted electronic mail. If so, the read information is transmitted to the server system 4. The read information is transferred from the server system 4 to the nonread-read executive unit 2 of the out-going side client terminal device through the server system 3.

The nonread-read executive unit 2 checks the received read information with the stored nonread executive information. If the read information is coincident with the nonread executive information, the read information is added to the nonread executive information. Then, the fact that the in-coming side client terminal device has read the electronic mail is verified by the out-going side client terminal device.

In a manner as described above, according to the present invention, the nonread-read executive unit 2 of the out-going side client terminal device can correctly check whether or not the in-coming side client terminal device has read the electronic mail, and thus the electronic mail nonread-read execution can be easily accomplished. In addition, since an existing protocol alone for the electronic mail is used for this execution, a great change is not required for an electronic mail system.

Furthermore, the present invention is adapted to be capable of performing the electronic mail nonread-read execution on the side of the client terminal device. This permits setting freely whether or not the nonread-read execution is performed on a client-by-client basis by the client terminal devices, which thus enables the client requiring the execution to introduce the execution of its own free will. Additionally, it is also possible to freely select the receiving side to be executed for checking whether or not the electronic mail has been read. Moreover, the present invention is constituted so that alias information possessed by the server may be also used, whereby it can comply with an alias expansion.

Figure 2:
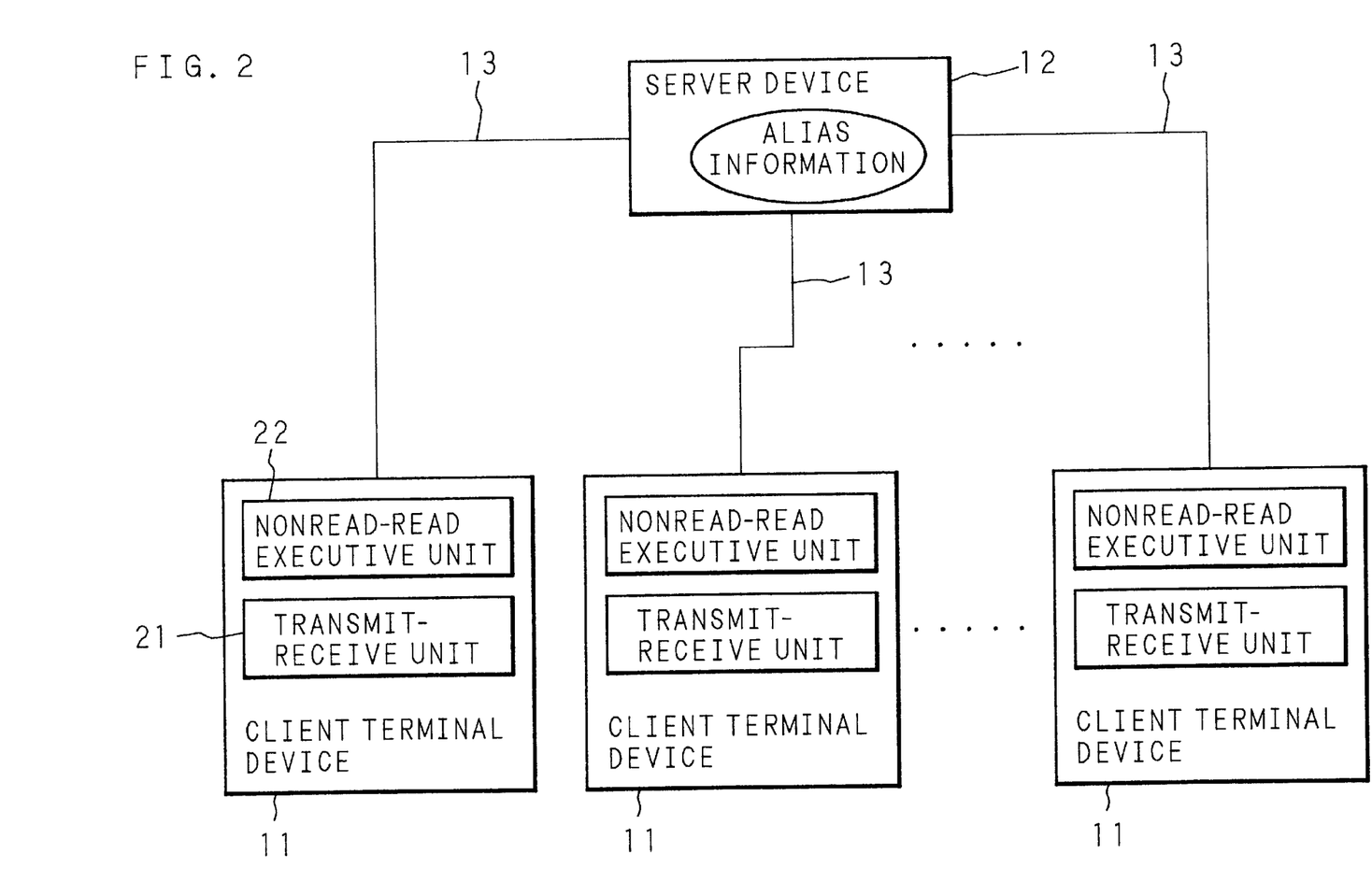
FIG. 2 shows a whole configuration of an electronic mail system according to the present invention.

FIG. 2 shows a whole configuration of the electronic mail system according to the present invention. In the drawing, numeral 11 denotes a client terminal device assigned to each client. The client terminal devices 11 are connected to each other through a LAN 13 and a server device 12, via which the electronic mail can be transmitted/received between the client terminal devices 11. The server device 12 controls the alias information.

Figure 3:
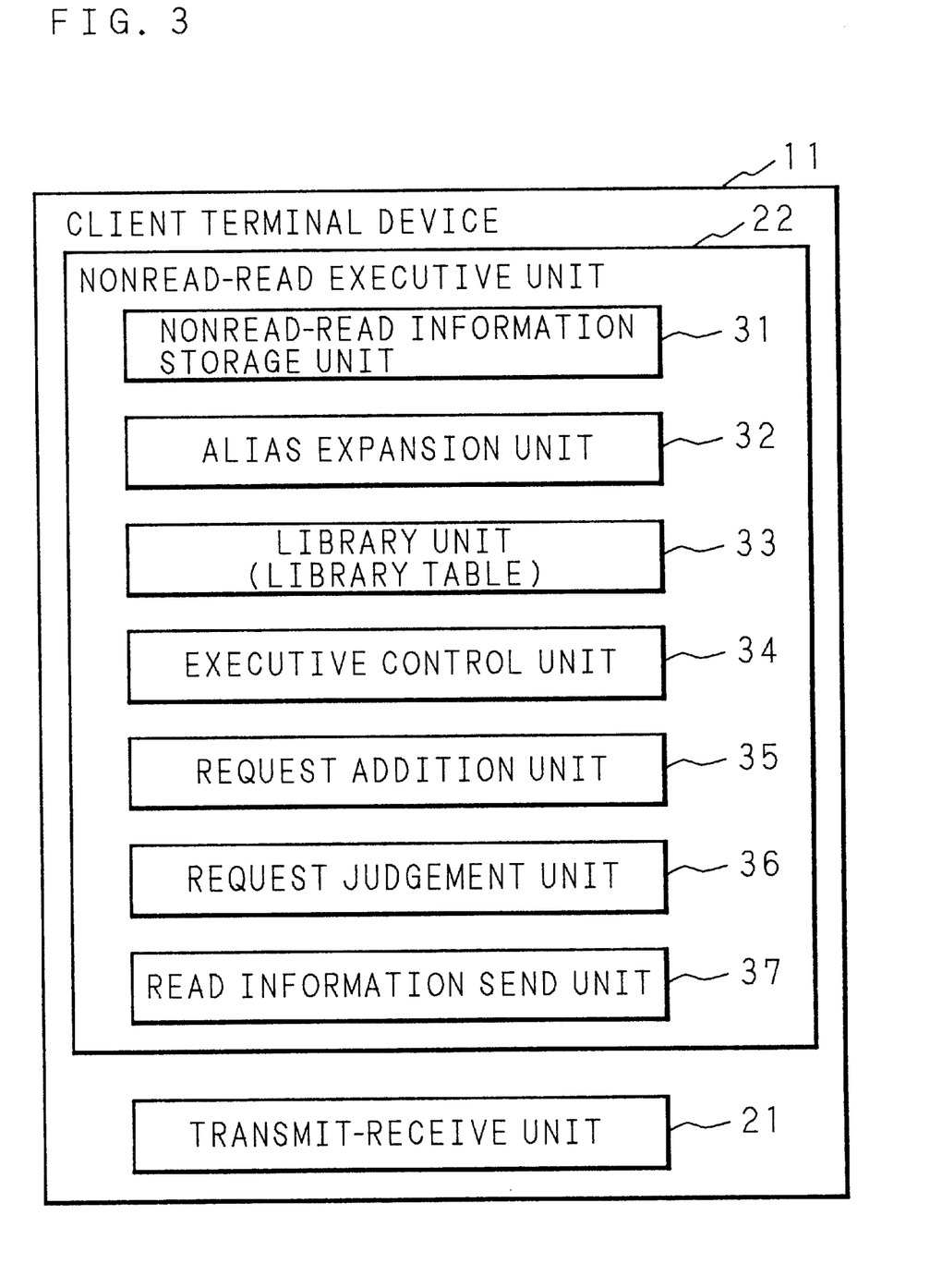
FIG. 3 is a block diagram showing an internal structure of a client terminal device.

FIG. 3 is a block diagram showing an internal structure of each client terminal device 11. The client terminal device 11 comprises a transmit-receive unit 21 for transmitting/receiving the electronic mail and a nonread-read executive unit 22 for performing the nonread-read execution for the electronic mail. The nonread-read executive unit 22 has a nonread-read information storage unit 31 for storing electronic mail nonread-read information; an alias expansion unit 32 for performing the alias expansion; a library unit 33 having the library table in which the receiving side to be executed for checking whether or not the electronic mail has been read is recorded; an executive control unit 34 for determining whether or not the electronic mail to be transmitted is to be executed for checking whether or not it is read, for writing the contents stored in the nonread-read information storage unit 31 and so on; a request addition unit 35 for adding the request information for read information notice to the electronic mail to be executed for checking whether or not it is read; a request judgement unit 36 for judging whether or not the request information for read information notice is added to the electronic mail; and a read information send unit 37 for sending electronic mail read information.

Of these units constituting the nonread-read executive unit 22, the nonread-read information storage unit 31, the alias expansion unit 32, the library unit 33, the executive control unit 34 and the request addition unit 35 are operated when the client terminal device 11 functions as the electronic mail transmitting side (out-going side). On the other hand, the request judgement unit 36 and the read information send unit 37 are operated when the client terminal device 11 functions as the electronic mail receiving side (in-coming side).

The contents recorded in the library table can be freely changed by the client terminal devices 11, and thus it is possible to optionally set the receiving side that needs the check in order to see whether or not the electronic mail has been read.

Figure 4:
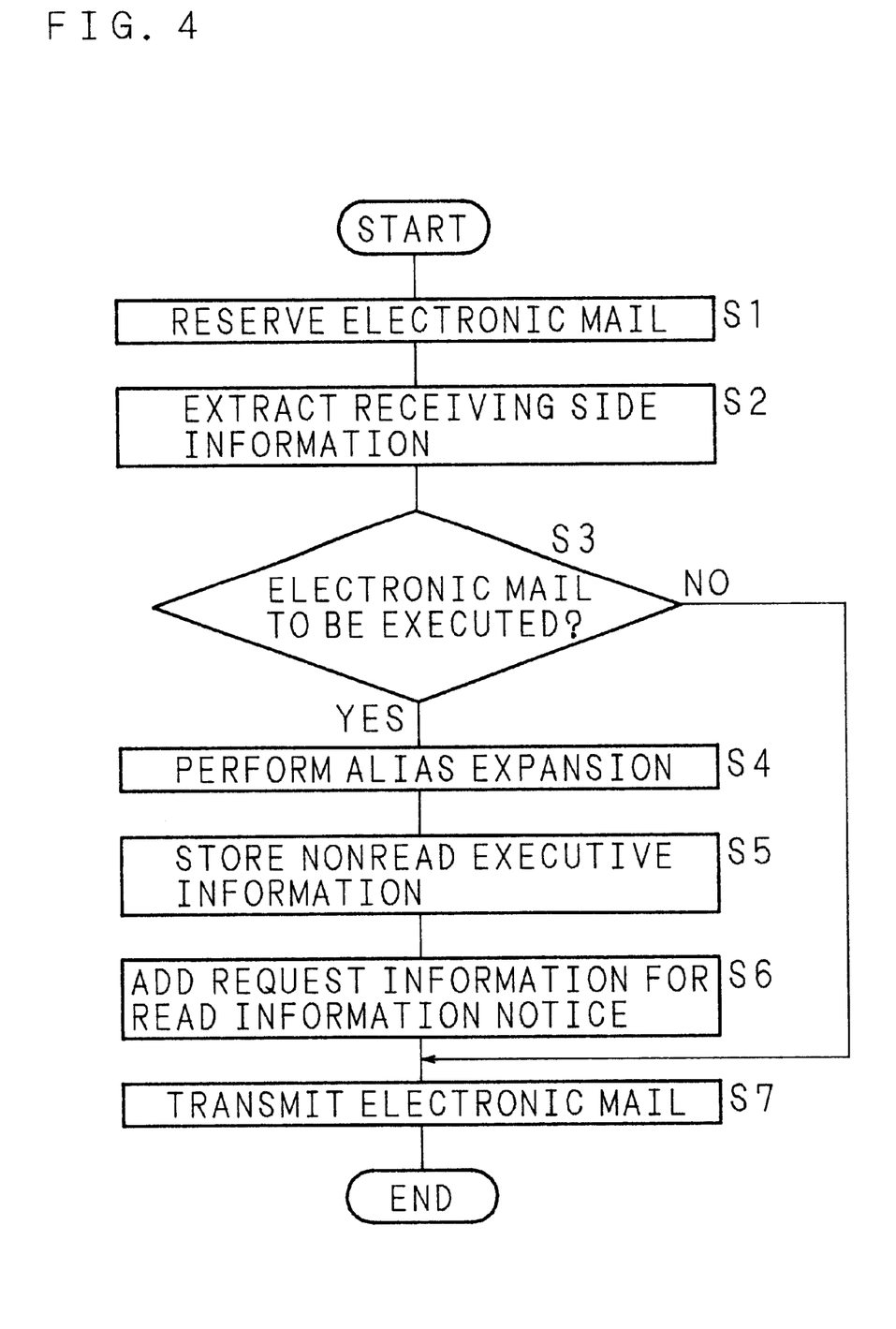
FIG. 4 is a flow chart showing the processing procedure of the present invention (the procedure of the processing performed by the out-going side client terminal device during the transmission of an electronic mail)
Figure 5:
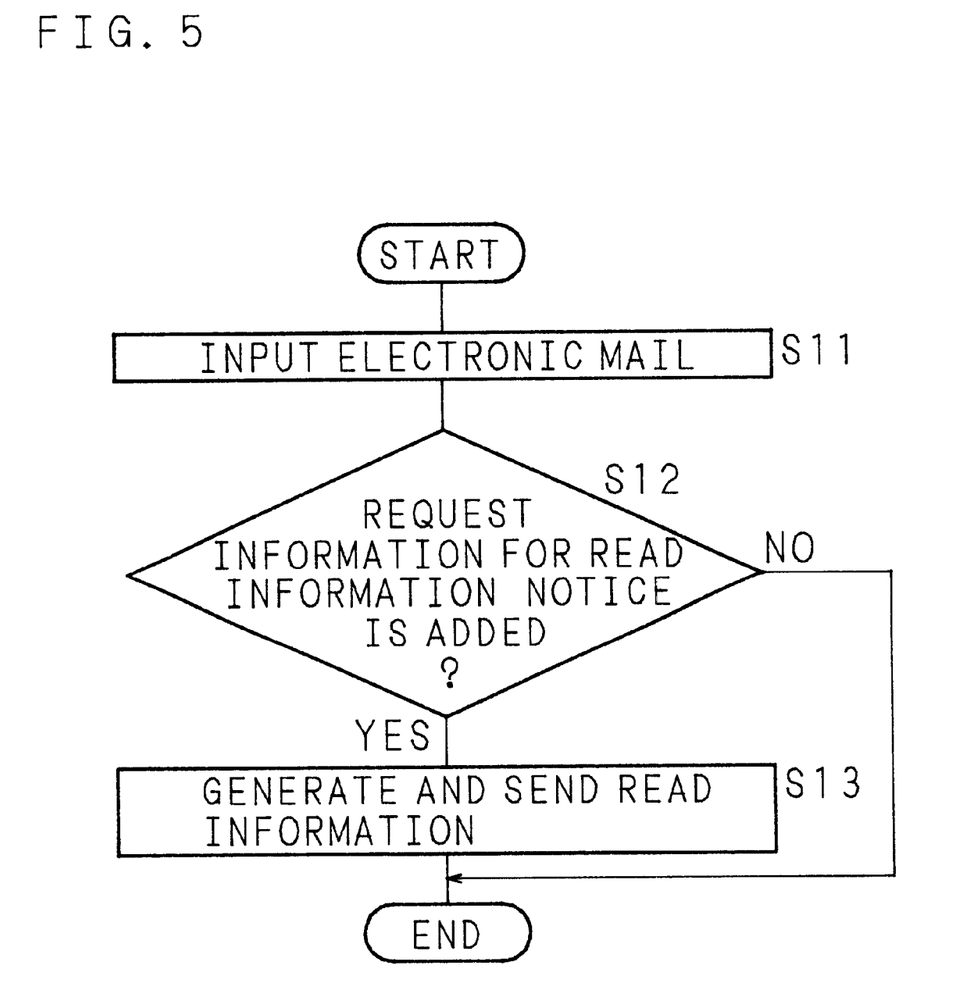
FIG. 5 is a flow chart showing the processing procedure of the present invention (the procedure of the processing performed by the in-coming side client terminal device during the receipt of the electronic mail)
Figure 6:
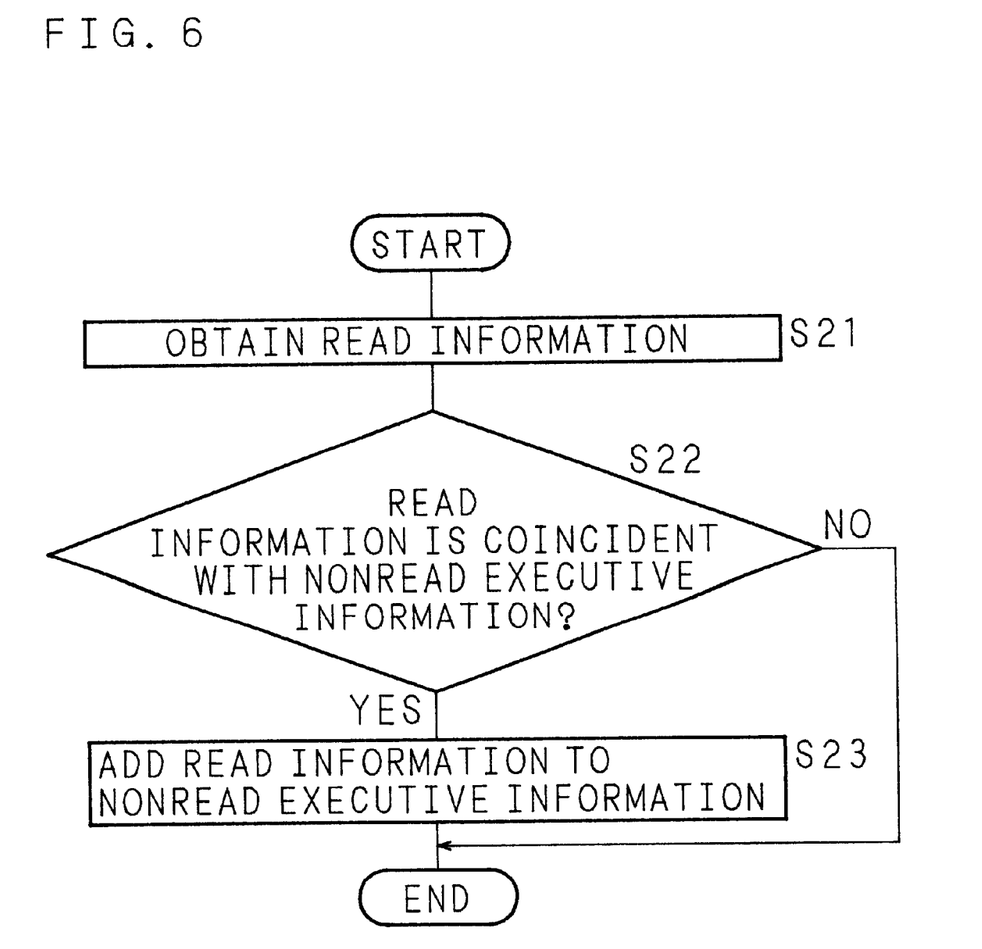
FIG. 6 is a flow chart showing the processing procedure of the present invention (the procedure of the processing performed by the out-going side client terminal device during the receipt of read information).

Next, the operation will be described. FIGS. 4 through 6 are flow charts showing the processing procedure of the present invention. FIG. 4 shows the procedure of the processing performed by the out-going side client terminal device 11 during the transmission of the electronic mail. FIG. 5 shows the procedure of the processing performed by the in-coming side client terminal device 11 during the receipt of the electronic mail. FIG. 6 shows the procedure of the processing performed by the out-going side client terminal device 11 during the receipt of the read information.

When the electronic mail is transmitted from the out-going side client terminal device 11 by the transmit-receive unit 21, the transmitted electronic mail is relayed through the nonread-read executive unit 22, and then the transmission of the mail to the server device 12 is temporarily reserved (Step S1). The executive control unit 34 extracts receiving side information from a header of the electronic mail (Step S2). A determination is made as to whether or not the receiving side is recorded in the library table of the library unit 33, that is, whether or not the electronic mail is to be executed for checking whether or not it is read (Step S3). More specifically, the extracted receiving side is checked with the receiving side recorded in the library table in which the receiving side to be executed for checking whether or not the mail is read is recorded, so as to thereby determine whether or not they are coincident with each other.

If the extracted receiving side is not recorded in the library table, namely, if the electronic mail is not to be executed for checking whether or not it is read (S3: NO), the processing proceeds to Step S7.

On the other hand, if recorded, namely, if the electronic mail is to be executed for checking whether or not it is read (S3: YES), the alias expansion unit 32 obtains the alias information controlled by the server device 12 so as to perform the expansion in accordance with the obtained alias information (Step S4).

In view of the result of this alias expansion as well, the executive control unit 34 causes the nonread-read information storage unit 31 to record/store, as the nonread executive information, the receiving side information on the electronic mail requiring the nonread-read execution (Step S5). When the extracted receiving side is defined as the alias, the nonread executive information on all of plural receiving sides corresponding to the extracted receiving side is individually stored. When the extracted receiving side is not defined as the alias, the nonread executive information on only the extracted receiving side is stored.

Then, the request addition unit 35 adds the request information for read information notice to the electronic mail to be executed for checking whether or not it is read (Step S6). After that, the temporarily reserved electronic mail is transmitted to the server device 12 through the LAN 13 (Step S7). As a result, the electronic mail to be executed is transferred with the request information for read information notice added to the electronic mail, while the electronic mail itself alone not to be executed is transferred.

When the in-coming side client terminal device 11 knows that the electronic mail is addressed to itself, the operation of the transmit-receive unit 21 allows the electronic mail to be input to this client terminal device 11 from the server device 12 through the LAN 13 (Step S11). The request judgement unit 36 judges whether or not the request information for read information notice is added to the input electronic mail (Step S12). If the request information for read information notice is not added to the electronic mail (S12: NO), the processing is terminated.

On the other hand, if the request information for read information notice is added to the electronic mail (S12: YES), the read information send unit 37 generates the read information and sends it to the server device 12 so that it can be sent back to the out-going side client terminal device 11 (Step S13). This read information is then sent from the in-coming side client terminal device 11 to the out-going side client terminal device 11 through the server device 12.

The executive control unit 34 of the out-going side client terminal device 11 obtains the read information returned from the in-coming side client terminal device 11 (Step S21). The obtained read information is checked with the nonread executive information stored in the nonread-read information storage unit 31 so as to thereby determine whether or not they are coincident with each other (Step S22). If they are not coincident with each other (S22: NO), the processing is terminated. On the other hand, if they are coincident with each other (S22: YES), the read information is added to the corresponding nonread executive information in the nonread-read information storage unit 31 (Step S23).

Therefore, the out-going side client terminal device 11 checks whether or not the read information is added to the nonread executive information in the nonread-read information storage unit 31, whereby it can easily recognize whether or not the electronic mail has been read. Moreover, the unread electronic mail can be easily retrieved by checking the contents in the nonread-read information storage unit 31.

According to the present invention, since only the existing protocol for the electronic mail system is used, it is unnecessary to change the existing transmit-receive unit 21 and server device 12. The functions capable of the nonread-read execution can be introduced in response to the intentions of the clients. Within the coverage range of the electronic mail, the nonread-read check can be also carried out between even the terminals inside and outside a fire wall.

Furthermore, since the present invention has an alias expansion function capable of using the alias information, the electronic mail to be transmitted to a single receiving side is also expanded to the individual receiving sides by the use of the alias expansion function, whereby the nonread-read execution can be performed for all the receiving sides.

As described above in detail, since the present invention is adapted to provide the client terminal device side with a nonread-read executive function, the nonread-read execution can be achieved by adding the function to the client terminal device side alone without considerably changing the existing electronic mail system. Moreover, since the nonread-read executive function can be introduced in the client terminal devices on the client-by-client basis, the client requiring the nonread-read execution can introduce the function of its own free will, and thus the nonread-read executive function can be readily introduced not only by the client terminal devices in a company or school but also by the general client terminal devices utilizing a general-purpose provider. Additionally, the client terminal device side can optionally set the receiving side to be executed for checking whether or not the electronic mail is read, and thus the present invention has higher convenience.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic mail system, comprising:

conventional e-mail servers connected to each other over a network; and client devices each of which are connected to a different one of said servers and transmitting/receiving an electronic mail to/from each other via said conventional e-mail servers, wherein each of said client devices has executive means for determining at a transmitting client if a receiving client must perform an electronic mail nonread-read execution for checking whether the electronic mail transmitted via said conventional e-mail servers by the transmitting client and received via said conventional e-mail servers by the receiving client has been read.

2. The electronic mail system according to claim 1, wherein said executive means has means for recording information of a header of an electronic mail for the receiving side that must perform nonread-read execution.

3. The electronic mail system according to claim 1, wherein said executive means comprises:

storage means for storing electronic mail nonread-read information;

library means having a library table for recording information of a header of an electronic mail for the receiving side that must perform nonread-read execution;

executive control means for determining if the receiving side must perform nonread-read execution responsive to a determination that receiving side information extracted from header of an electronic mail to be transmitted matches the receiving side information in the library table and for writing the nonread-read information in said storage means;

request addition means for adding request information for read notice to the electronic mail to be executed for checking whether or not it is read;

request judgment means for judging whether or not the request information is added to the received electronic mail; and read information send means for sending read information when the electronic mail with the request information added is received.

4. The electronic mail system according to claim 3, wherein said executive means further comprises means for performing an alias expansion.

5. A client device connected to a first conventional e-mail server on a network, comprising:

means for transmitting/receiving, via the first conventional e-mail server and a second conventional e-mail server, an electronic mail having a standard electronic mail header to/from another client device connected to the second conventional e-mail server on the network, the electronic mail being capable of being read by a standard electronic mail client; and executive means for, in response to receiving side header information in the standard electronic mail header, determining if the receiving side must perform an electronic mail nonread-read execution for checking whether the electronic mail received via the first and second conventional e-mail servers by the receiving side has been read.

6. The client device according to claim 5, wherein said executive means comprises:

storage means for storing electronic mail nonread-read information;

library means having a library table for recording information of a header of an electronic mail for the receiving side that must perform nonread-read execution;

executive control means for determining if the receiving side must perform nonread-read execution responsive to a determination that receiving side information extracted from a header of an electronic mail to be transmitted matches the receiving side information in the library table and for writing nonread-read information in said storage means;

request addition means for adding request information for read notice to the electronic mail to be executed for checking whether or not it is read;

request judgment means for judging whether or not the request information is added to the received electronic mail; and read information send means for sending read information when the electronic mail with the request information added is received.

7. The client device according to claim 6, wherein said executive means further comprises means for performing an alias expansion.

8. The client device according to claim 5, wherein said executive means comprises:

storage means for storing electronic mail nonread-read information;

library means having a library table for recording information of a header of an electronic mail for the receiving side that must perform nonread-read execution;

executive control means for determining if the receiving side must perform nonread-read execution responsive to a determination that receiving side information extracted from a header of an electronic mail to be transmitted matches the receiving side information in the library table and for writing nonread-read information in said storage means; and request addition means for adding request information for read notice to the electronic mail to be executed for checking whether or not it is read.

9. The client device according to claim 8, wherein said executive means further comprises means for performing an alias expansion.

10. The client device according to claim 5, wherein said executive means comprises:

judgement means for judging whether or not the received electronic mail is the one to be executed for checking whether or not it is read; and read information send means for sending read information when the electronic mail to be executed is received.

11. An electronic mail system, comprising:

conventional e-mail servers connected to each other over a network; and client devices each of which is connected to a different one of the conventional e-mail servers to transmit/receive an electronic mail to/from each other via the conventional e-mail servers with the client devices comprising an executive unit determining if a receiving side must perform an electronic mail nonread-read execution to check whether the electronic mail received via the conventional e-mail servers by the receiving side has been read.

12. A client device connected to a first conventional e-mail server on a network, comprising:

a transmit-receiving unit transmitting/receiving, via the first conventional e-mail server and a second conventional e-mail server, an electronic mail to/from another client device connected to the second conventional e-mail server on a network; and an executive unit, in response to a receiving side header information of the electronic mail, determining if the receiving side must perform an electronic mail nonread-read execution to check whether the electronic mail received via the conventional e-mail servers by the receiving side has been read.

13. A client device connected to a first conventional e-mail server comprising a process of:

transmitting/receiving, via the first conventional e-mail server and a second conventional e-mail server, an electronic mail to/from another client device connected to the second conventional e-mail server on a network; and when transmitting the electronic mail determining if a receiving side must perform an electronic mail nonread-read execution checking whether the electronic mail received via the conventional e-mail servers by the receiving side has been read, responsive to a determination that receiving side information extracted from a header of the electronic mail to be transmitted matches receiving side information in a library table in the client device.

14. A method for enabling a sending e-mail client to acknowledge that a receiving e-mail client has read a standard e-mail protocol message sent via conventional e-mail servers by the sending e-mail client, comprising:

adding, at the sending e-mail client, a request for read notice to the standard e-mail protocol message;

sending, at the sending e-mail client, the standard e-mail protocol message with the request for read notice, to a conventional first e-mail server;

transmitting the standard e-mail protocol message with the request for read notice to a second conventional e-mail server;

receiving, at the receiving e-mail client, from the second conventional e-mail server, the standard e-mail protocol message with the request for read notice;

checking, at the receiving e-mail client, if the request for read notice is present in the standard e-mail protocol message; and acknowledging that the receiving e-mail client has received the standard e-mail protocol message by transmitting, via the first and second conventional e-mail servers, to the sending e-mail client from the receiving e-mail client a read information of the received standard e-mail protocol message.

15. A method of e-mail acknowledgment, comprising:

adding request information for read information notice to an e-mail message with a first e-mail client;

sending the e-mail message to a first e-mail server;

transmitting the e-mail message over a network from the first e-mail server to a second e-mail server;

receiving the e-mail message from the second e-mail server with a second e-mail client; and sending read information notice of the received e-mail message from the second e-mail client to the first e-mail client, responsive to the presence of the request information in the transmitted and received e-mail message.

16. The electronic mail system according to claim 1, wherein said executive means comprises:

request addition means for adding request information for read notice to the electronic mail to be executed for checking whether or not it is read;

request judgment means for judging whether or not the request information is added to the received electronic mail; and read information send means for sending read information when the electronic mail with the request information added is received.

17. The electronic mail system according to claim 16, wherein said executive means further comprises means for recording information of a header of an electronic mail for the receiving side that must perform nonread-read execution.

18. The electronic mail system according to claim 17, wherein said executive means further comprises means for performing an alias expansion.

19. The electronic mail system according to claim 16, wherein said executive means further comprises:

storage means for storing electronic mail nonread-read information;

library means having a library table for recording information of a header of an electronic mail for the receiving side that must perform nonread-read execution; and executive control means for determining if the receiving side must perform nonread-read execution responsive to a determination that receiving side information extracted from header of an electronic mail to be transmitted matches the receiving side information in the library table and for writing the nonread-read information in said storage means.

20. The client device according to claim 5, wherein said executive means comprises:

request addition means for adding request information for read notice to the electronic mail to be executed for checking whether or not it is read;

request judgment means for judging whether or not the request information is added to the received electronic mail; and read information send means for sending read information when the electronic mail with the request information added is received.

21. The client device according to claim 20, wherein said executive means further comprises means for performing an alias expansion.

22. The client device according to claim 20, wherein said executive means further comprises:

judgement means for judging whether or not the received electronic mail is the one to be executed for checking whether or not it is read; and read information send means for sending read information when the electronic mail to be executed is received.

23. The client device according to claim 20, wherein said executive means further comprises:

storage means for storing electronic mail nonread-read information;

library means having a library table for recording information of a header of an electronic mail for the receiving side that must perform nonread-read execution; and executive control means for determining if the receiving side must perform nonread-read execution responsive to a determination that receiving side information extracted from a header of an electronic mail to be transmitted matches the receiving side information in the library table and for writing nonread-read information in said storage means.

* * * * *